US011153211B2

(12) United States Patent
Ravi et al.

(10) Patent No.: US 11,153,211 B2
(45) Date of Patent: Oct. 19, 2021

(54) FAST DATA CENTER CONGESTION RESPONSE

(71) Applicant: Intel Corporation, Santa Clara, CA (US)

(72) Inventors: Vignesh Trichy Ravi, Portland, OR (US); Ravi Murty, Portland, OR (US); Ravindra Babu Ganapathi, Hillsboro, OR (US); Michael A. Parker, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 799 days.

(21) Appl. No.: 15/836,850

(22) Filed: Dec. 9, 2017

(65) Prior Publication Data

US 2019/0182161 A1 Jun. 13, 2019

(51) Int. Cl.
H04W 4/00 (2018.01)
H04L 12/801 (2013.01)
H04L 12/835 (2013.01)
H04L 12/851 (2013.01)
H04L 12/825 (2013.01)

(52) U.S. Cl.
CPC .......... H04L 47/12 (2013.01); H04L 47/11 (2013.01); H04L 47/2425 (2013.01); H04L 47/2483 (2013.01); H04L 47/263 (2013.01); H04L 47/30 (2013.01)

(58) Field of Classification Search
CPC ..... H04L 47/12; H04L 47/11; H04L 47/2425; H04L 47/2483; H04L 47/263; H04L 47/30
See application file for complete search history.

(56) References Cited

U.S. PATENT DOCUMENTS

| 2008/0225715 | A1* | 9/2008 | Plamondon | H04L 47/11 370/232 |
| 2012/0033550 | A1* | 2/2012 | Yano | H04L 47/10 370/230 |
| 2013/0135999 | A1* | 5/2013 | Bloch | H04L 47/263 370/235 |
| 2013/0322237 | A1* | 12/2013 | DeCusatis | H04L 41/00 370/230 |
| 2019/0068503 | A1* | 2/2019 | Wei | H04L 47/24 |
| 2020/0396170 | A1* | 12/2020 | Gafni | H04L 47/30 |

* cited by examiner

Primary Examiner — Abdelnabi O Musa
(74) Attorney, Agent, or Firm — Patent Capital Group

(57) ABSTRACT

There is included in one example a switch, including: an ingress port to receive data from a source host; a first egress port to send data to a destination host; a second egress port to send data to the source host; and a congestion notification generator (CNG) including: a congestion detector to compute bandwidth consumption of a flow associated with a packet received on the ingress port and assigned to the first egress port, and determine based on the computed bandwidth consumption that the flow is congested; a flow extractor to extract a flow identifier of the flow from the packet; a throttle calculator to calculate a quantitative flow throttle value for the flow; and a header builder to build a congestion notification packet to instruct the source host to throttle the flow.

25 Claims, 11 Drawing Sheets

FAST DATA CENTER CONGESTION RESPONSE

FIELD OF THE SPECIFICATION

This disclosure relates in general to the field of network computing, and more particularly, though not exclusively, to a system and method for fast congestion response.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
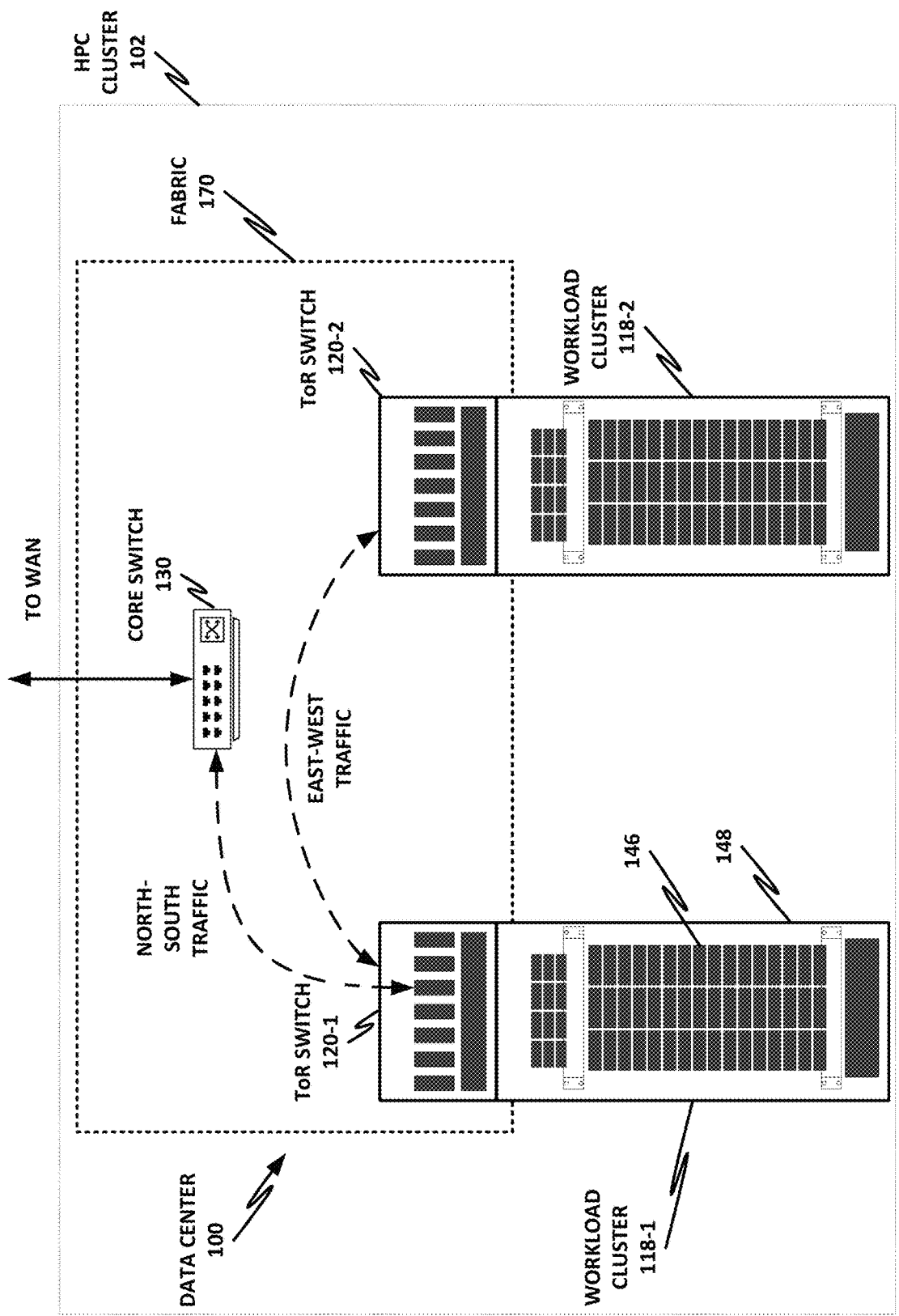
FIG. 1 is a block diagram of selected components of a data center, which may provide a high performance computing (HPC) cluster, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a high performance computing (HPC) cluster, the hardware platform may include rackmounted servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer, and/or containerization, wherein instances of network functions are provided in "containers" that are separated from one another, but that share underlying operating system, memory, and driver resources.

In a large data center, such as an HPC cluster, network congestion can become a limiting factor in overall system performance. For example, if one host in communicating with another host causes the ingress data rate in a switch port to exceed what the switch port can process, then overall network performance can be affected.

Network or fabric congestion can severely degrade the performance as well as the utilization of the fabric, which can directly affect application performance and customer satisfaction.

In arbitrating network congestion, considerations include speed, responsiveness, fairness (for example, throttling only the root of the congestion and not the victim), and transparency to software (for example, by providing an end-to-end fabric hardware acceleration solution).

Congestion response is not by itself a new issue in data centers. For example, HPC data centers that employ Infini-Band may use forward explicit congestion notification (FECN) and backward explicit congestion notification (BECN) bits to detect and respond to congestion. When a network switch in the fabric detects congestion on an ingress interface, such as in a particular flow, the switch may set the FECN bit on the header for that packet. The switch then forwards the packet to the destination host via an egress interface, and the FECN bit is maintained within the fabric until the packet reaches the destination node. When the destination node receives the packet, it observes that the FECN bit is set, and when providing a Response (RESP) or Acknowledge (ACK) packet to the source host, sets a BECN bit, which can be propagated back to the sender. The destination host then sends the packet to the fabric via an egress interface, and the switches within the fabric maintain the BECN bit as the packet is propagated throughout the fabric. Finally, the last hop switch forwards the packet to the sender host, and upon receipt of the packet, the sender host observes the BECN bit. After observing the BECN bit, the sender host incrementally throttles its packet bandwidth on that flow to back off of the congestion.

As the sender host continues to send packets out into the fabric, switches within the fabric receive the packets, and continue to observe the bandwidth utilization. If the bandwidth utilization is still too high, then the switches may continue to iteratively set the FECN bit, so that on the return journey the sender receives the BECN bit, and scales back its bandwidth utilization another notch. Finally, when the desired bandwidth is achieved, the switches within the fabric cease to set the FECN bit, and the desired bandwidth can be maintained.

Observation of bandwidth utilization within the fabric itself provides advantages over, for example, observation of bandwidth utilization within the sender host. The sender host may not have an overall multi-host view of bandwidth utilization. Thus, the sender may be inadvertently oversubscribing to the fabric, not because it is sending data too fast by itself, but because too many devices of the same traffic class are sending packets and oversubscribing the fabric.

While the use of FECN and BECN bits to detect and scale back bandwidth utilization may be able in some embodiments to achieve conformity to service level agreements (SLAs) or quality of service (QoS) requirements, there is some delay in the processing. First, latency is introduced because the packet with the FECN bit, along with the RESP or ACK with the corresponding BECN bit needs to traverse the entire fabric before it reaches the sender. This may lead to a relatively slow response to congestion as the number of hops within the fabric increases, in addition to queuing and processing delays on the receiver or sender nodes, which may include multiple queues. Furthermore, the FECN and BECN-marked packets themselves tend to proceed through the congested path, thus actually contributing to the congestion. In some cases, the FECN and BECN-marked packets may also get dropped, in which case the sender host is not notified of the congested state. Additionally, the incremental nature of the use of FECN and BECN bits means that it may take several iterations of this process to reach the desired bandwidth utilization. Finally, processing of FECN and BECN bits is generally performed at the protocol layer (e.g., Layer 4), thus requiring intervention of software to throttle the bandwidth.

To achieve faster congestion response times, it is advantageous to provide a system and method in which the network switch and the host fabric interface interoperate to minimize the number of hops before the congestion response is initiated so as to improve the overall congestion responsiveness. When congestion response is provided within a host fabric interface (HFI), then the congestion response can be handled at a lower level, such as Layer 2 of the network stack, so that the solution can be agnostic to Layer 4 transport entities. This presents an end-to-end hardware acceleration protocol within the switch and the HFI that achieves improved congestion response.

This fast congestion response can be achieved by providing a network switch on the fabric that analyzes incoming packets on the ingress interface, and determines whether those packets belong to a flow that has oversubscribed the fabric. If the packets do belong to a flow that has oversubscribed the fabric, then rather than setting a FECN bit that needs to fully traverse the fabric and the destination device in a full round-trip, the network switch can notify the offending HFI via channels that are out-of-band of the normal flow of traffic. While it is possible to provide explicit congestion notification via dedicated out-of-band physical interconnects (such as physical wires), this may not be necessary in all cases. In some cases, the notification can be provided out-of-band of the normal packet flow, but can still be provided via the existing interconnects. For example, when a network switch detects a packet belonging to an oversubscribed flow on an ingress interface, it can forward the packet to the destination host via a first egress interface, while also operating a second egress interface that is communicatively coupled to the sender host to send a special congestion notification header (CNH) packet to the sender host. This special CNH packet may have a CNH bit set, which indicates that this packet is not a normal packet with an ordinary payload, but rather is a dedicated CNH packet. The CNH packet in one example includes the source and destination addresses from the original packet, which are "flipped" or transposed so that the sender is the destination and the receiver is the source. The CNH may also include an identification of the flow that is to be throttled. For example, Intel® Omni-Path Architecture (OPA) in some existing embodiments provides up to eight traffic classes. If the flow belongs to a traffic class with a lower bandwidth allocation, then the switch may designate that flow for throttling. Finally, in some embodiments, the CNH may also include a quantitative flow throttle value. For example, based on incoming flows of a particular traffic class, the network switch may calculate how much these flows are oversubscribing the fabric for that traffic class. Rather than iteratively continue to send CNH packets that instruct the HFI to throttle the fabric by an individual quantum amount at a time, the network switch can compute a quantitative flow throttle value and send that to the HFI, achieving an aggressive aggregate "backoff" (or throttle).

Upon receipt of the CNH, the HFI observes that the CNH bit is set, and responsive to that observation may identify a flow that is to be throttled, and determine the quantitative amount that the flow should be throttled. The HFI may convert the quantitative flow throttle to a locally usable value, such as an interpacket gap (IPG) or interpacket delay (IPD) to realize the required throttling.

Advantageously, this system provides an end-to-end system and method for transport agnostic, fine-grained, low latency congestion response at "first sight" that is hardware accelerated at the Layer 2 switch and source HFI.

This system detects and responds to congestion at first sight rather than requiring a full round-trip of a packet to respond to the congestion. This system also eliminates target (a.k.a., receive-side) host involvement in the delay. Elimination of the destination device also reduces the number of hops in the congestion response path. For example, if congestion is detected at the last hop switch to which the source device is directly connected, then congestion can be responded to in a single hop, rather than two traversals through the entire fabric on a round-trip.

The system described herein is further advantageously fine-grained. Flows are throttled at the source device and flows are throttled by a quantitative amount computed by the network switch rather than iteratively by quantum amounts. Furthermore, the solution described herein is transport agnostic. A Layer 2 switch provides the method by communicating directly with a Layer 2 HFI, thus providing a method that can be leveraged by any higher-level Layer 4 transports without even needing to be aware of the congestion response mechanism.

The HFI and the network switch described herein may be codesigned to generate congestion notification on the switch side, and to allow the HFI on the source device side to respond to congestion notifications.

The CNH described herein may include the following information by way of nonlimiting example:

The Layer 2 address of the source causing the congestion (provided in the destination field of the CNH).

The fine-grained QoS or flow information necessary for the source device to throttle only that flow.

The quantitative flow throttle value that instructs the source device how much to throttle that particular flow.

On the side of the switch, necessary parameters to calculate the quantitative flow throttle value may be provided. This may be based on a multi-objective function that includes the capacity of the switch, QoS and SLA values for the flow on the source, the traffic class to which the flow belongs, and other factors that may be useful in determining whether and by how much the flow is oversubscribing the fabric. Advantageously, the quantitative flow throttle can be provided as an aggregate throttling, as opposed to micro throttling per BECN packet. This further enhances the speed of the congestion response, by performing the full throttling in a single packet, rather than incrementally by quantum values.

According to the present specification, an HFI may be provided with a CNH processor, which may include any combination of hardware, software, instructions, firmware, coprocessor, or other logic elements configured to provide the CNH processing operations described herein. The network switch may be provided with a congestion notification generator (CNG), which similarly may be provided in any suitable hardware, software, firmware, coprocessor, or other logic elements as necessary. In one example, the ACNG is provided as a low-cost hardware device such as an ASIC or FPGA that can quickly generate the CNH and send it out to the offending source device.

The combination of the HFI and the switch described herein provides advantages over the existing solutions that use the FECN/BECN protocol, which in some cases may have limited effectiveness on large fabrics because the bits must traverse the entire fabric in a complete round-trip before the offending source device is notified. As described above, this round-trip often itself takes place on the congested channel, and in some cases may be dropped. The solution described in this specification avoids the congested path in the forward direction, and instead immediately sends an out-of-band notification to the sender device in the backward direction.

The solution described herein provides a reactionary mechanism for congestion control. It is generally orthogonal to congestion avoidance, and in some cases may be supplementary to congestion avoidance protocols that are predictive in nature. Furthermore, on applications and programming models that do not tolerate out-of-order packets, the system and method described herein provide congestion management without interfering with packet order, because the notification is provided at Layer 2 in an out-of-band fashion.

A system and method for fast congestion response will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of selected components of a data center 100, which may provide a high performance computing (HPC) cluster 102, according to one or more examples of the present specification. Embodiments of data center 100 disclosed herein may be adapted or configured to interoperate with a fast congestion response system according to the teachings of the present specification. Nonlimiting embodiments of HPC cluster 102 may include a traditional enterprise data center, an enterprise "private cloud," or a "public cloud," providing services such as infrastructure as a service (IaaS), platform as a service (PaaS), or software as a service (SaaS). In other embodiments, data center 100 may provide a cloud service provider (CSP), by way of nonlimiting example.

HPC cluster 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

In this illustration, workload clusters 118 are shown as modular workload clusters conforming to the rack unit ("U") standard, in which a standard rack, 19 inches wide, may be built to accommodate 42 units (42U), each 1.75 inches high and approximately 36 inches deep. In this case, compute resources such as processors, memory, storage, accelerators, and switches may fit into some multiple of rack units from one to 42.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switches, such as Layer 2 switches within switching fabric 170 by way of nonlimiting example, can be provided with an ACNG as described in the specification. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include an Intel® Host Fabric Interface (HFI), a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such as where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® Omni-Path™, TrueScale™, Ultra Path Interconnect (UPI) (formerly called QPI or KTI), FibreChannel, Ethernet, Fibre-Channel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as Omni-Path™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer. Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are not intended to be nonlimiting.

Figure 2:
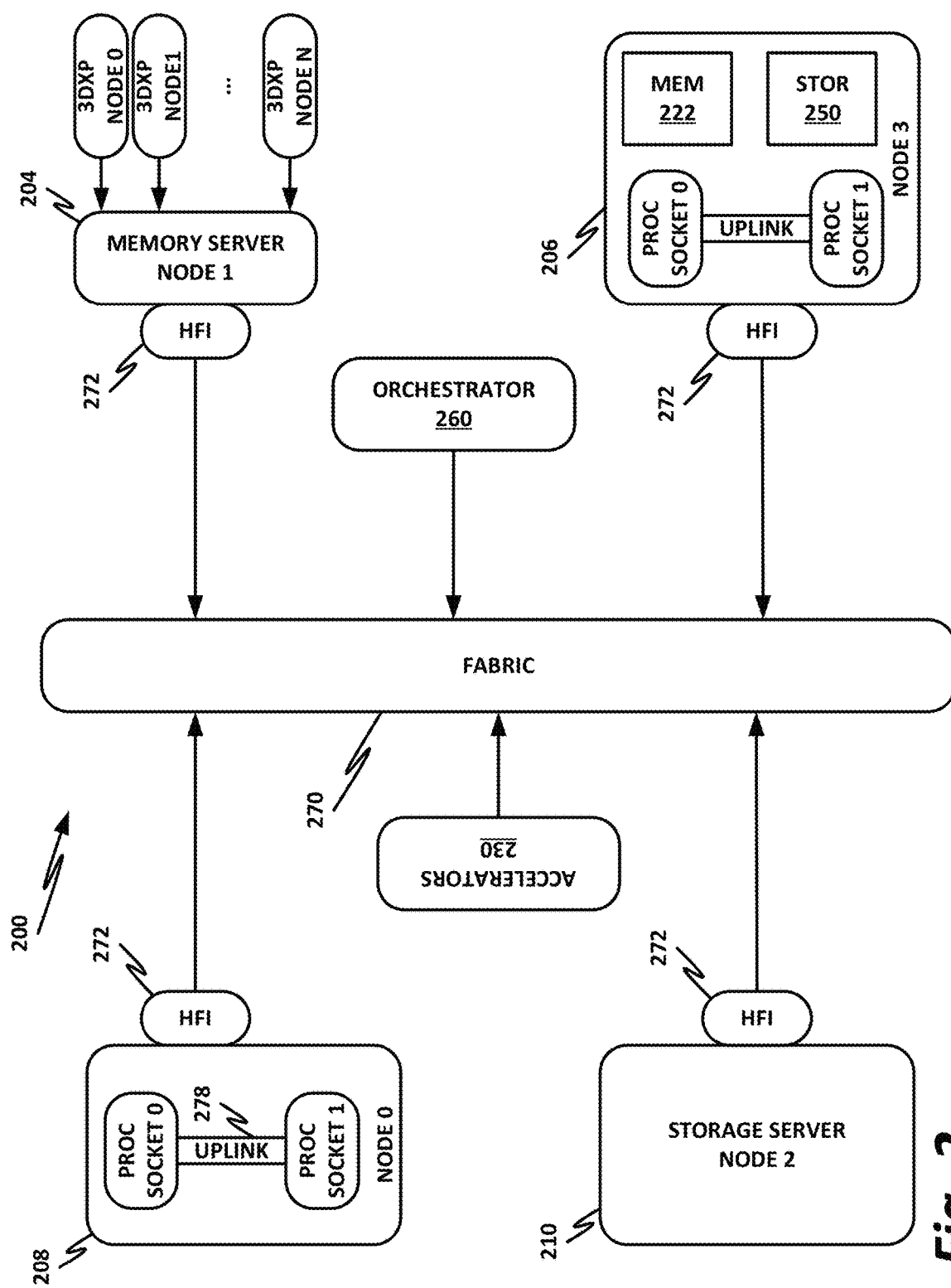
FIG. 2 is a block diagram of a data center, according to one or more examples of the present specification.

FIG. 2 is a block diagram of a data center 200, according to one or more examples of the present specification. Embodiments of data center 200 disclosed herein may be adapted or configured to interoperate with a fast congestion response system according to the teachings of the present specification. Data center 200 may be, in various embodiments, the same as network 100 of FIG. 1, or may be a different data center. Additional views are provided in FIG. 2 to illustrate different aspects of data center 200.

In this example, a fabric 270 is provided to interconnect various aspects of data center 200. Fabric 270 may be the same as fabric 170 of FIG. 1, or may be a different fabric. As in FIG. 1, by way of nonlimiting example, switches such as Layer 2 switches within the fabric can be provided with an ACNG as described in the specification. Similar to fabric 170 of FIG. 1 above, fabric 270 may be provided by any suitable interconnect technology. In this example, Intel® Omni-Path™ is used as an illustrative and nonlimiting example.

As illustrated, data center 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via an HFI 272. HFIs 272 can be provided with a CNH processor as described in the present specification. HFI 272 may connect to an Intel® Omni-Path™ fabric. In some examples, communication with fabric 270 may be tunneled, such as by providing UPI tunneling over Omni-Path™.

Because data center 200 may provide many functions in a distributed fashion that in previous generations were provided onboard, a highly capable HFI 272 may be provided. HFI 272 may operate at speeds of multiple gigabits per second, and in some cases may be tightly coupled with node 0 208. For example, in some embodiments, the logic for HFI 272 is integrated directly with the processors on a system-on-a-chip. This provides very high speed communication between HFI 272 and the processor sockets, without the need for intermediary bus devices, which may introduce additional latency into the fabric. However, this is not to imply that embodiments where HFI 272 is provided over a traditional bus are to be excluded. Rather, it is expressly anticipated that in some examples, HFI 272 may be provided on a bus, such as a PCIe bus, which is a serialized version of PCI that provides higher speeds than traditional PCI. Throughout data center 200, various nodes may provide different types of HFIs 272, such as onboard HFIs and plug-in HFIs. It should also be noted that certain blocks in a system on a chip may be provided as intellectual property (IP) blocks that can be "dropped" into an integrated circuit as a modular unit. Thus, HFI 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a HFI 272, which provides fast communication that makes these technologies possible.

By way of further illustration, node 3 206 is also depicted. Node 3 206 also includes a HFI 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

Data center 200 may also include accelerators 230. These may provide various accelerated functions, including hardware or coprocessor acceleration for functions such as packet processing, encryption, decryption, compression, decompression, network security, or other accelerated functions in the data center. In some examples, accelerators 230 may include deep learning accelerators that may be directly attached to one or more cores in nodes such as node 0 208 or node 3 206. Examples of such accelerators can include, by way of nonlimiting example, Intel® QuickData Technology (QDT), Intel® QuickAssist Technology (QAT), Intel® Direct Cache Access (DCA), Intel® Extended Message Signaled Interrupt (MSI-X), Intel® Receive Side Coalescing (RSC), and other acceleration technologies.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
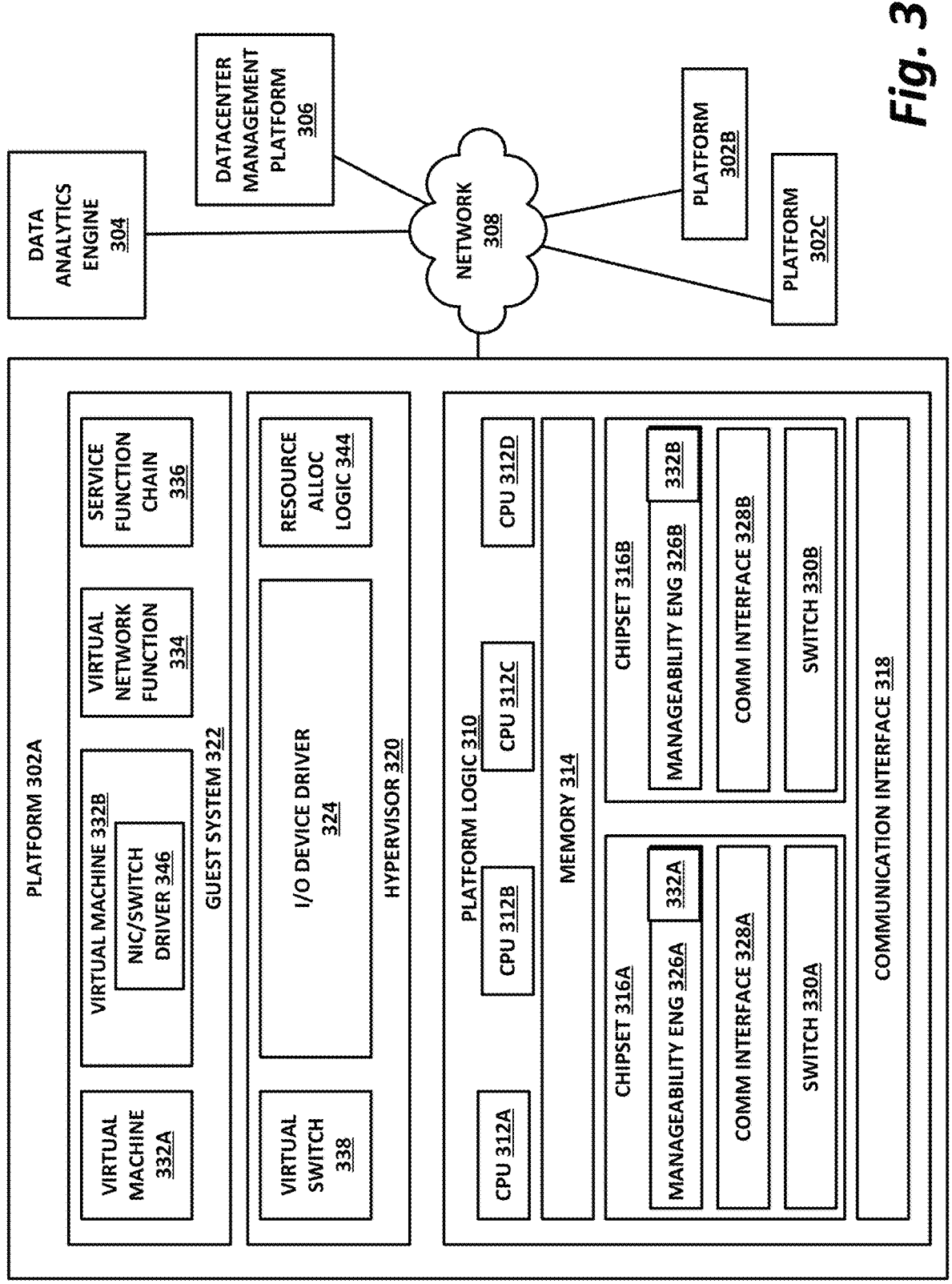
FIG. 3 is a block diagram of components of a computing platform, according to one or more examples of the present specification.

FIG. 3 illustrates a block diagram of components of a computing platform 302A, according to one or more examples of the present specification. Embodiments of computing platform 302A disclosed herein may be adapted or configured to interoperate with a fast congestion response system according to the teachings of the present specification. In the embodiment depicted, platforms 302A, 302B, and 302C, along with a data center management platform 306 and data analytics engine 304 are interconnected via network 308. Platforms 302 can be provided with an HFI or other logic that provides the CNH processing of the present specification. In other embodiments, a computer system may include any suitable number of (i.e., one or more) platforms. In some embodiments (e.g., when a computer system only includes a single platform), all or a portion of the system management platform 306 may be included on a platform 302. A platform 302 may include platform logic 310 with one or more central processing units (CPUs) 312, memories 314 (which may include any number of different modules), chipsets 316, communication interfaces 318, and any other suitable hardware and/or software to execute a hypervisor 320 or other operating system capable of executing workloads associated with applications running on platform 302. In some embodiments, a platform 302 may function as a host platform for one or more guest systems 322 that invoke these applications. Platform 302A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 306, hypervisor 320, or other operating system) of computer platform 302A may assign hardware resources of platform logic 310 to perform workloads in accordance with the stress information. In some embodiments, self-diagnostic capabilities may be combined with the stress monitoring to more accurately determine the health of the hardware resources. Each platform 302 may include platform logic 310. Platform logic 310 comprises, among other logic enabling the functionality of platform 302, one or more CPUs 312, memory 314, one or more chipsets 316, and communication interfaces 328. Although three platforms are illustrated, computer platform 302A may be interconnected with any suitable number of platforms. In various embodiments, a platform 302 may reside on a circuit board that is installed in a chassis, rack, or other suitable structure that comprises multiple platforms coupled together through network 308 (which may comprise, e.g., a rack or backplane switch).

CPUs 312 may each comprise any suitable number of processor cores and supporting logic (e.g., uncores). The cores may be coupled to each other, to memory 314, to at least one chipset 316, and/or to a communication interface 318, through one or more controllers residing on CPU 312 and/or chipset 316. In particular embodiments, a CPU 312 is embodied within a socket that is permanently or removably coupled to platform 302A. Although four CPUs are shown, a platform 302 may include any suitable number of CPUs.

Memory 314 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 314 may be used for short, medium, and/or long term storage by platform 302A. Memory 314 may store any suitable data or information utilized by platform logic 310, including software embedded in a computer readable medium, and/or encoded logic incorporated in hardware or otherwise stored (e.g., firmware). Memory 314 may store data that is used by cores of CPUs 312. In some embodiments, memory 314 may also comprise storage for instructions that may be executed by the cores of CPUs 312 or other processing elements (e.g., logic resident on chipsets 316) to provide functionality associated with the manageability engine 326 or other components of platform logic 310. A platform 302 may also include one or more chipsets 316 comprising any suitable logic to support the operation of the CPUs 312. In various embodiments, chipset 316 may reside on the same die or package as a CPU 312 or on one or more different dies or packages. Each chipset may support any suitable number of CPUs 312. A chipset 316 may also include one or more controllers to couple other components of platform logic 310 (e.g., communication interface 318 or memory 314) to one or more CPUs. In the embodiment depicted, each chipset 316 also includes a manageability engine 326. Manageability engine 326 may include any suitable logic to support the operation of chipset 316. In a particular embodiment, a manageability engine 326 (which may also be referred to as an innovation engine) is capable of collecting real-time telemetry data from the chipset 316, the CPU(s) 312 and/or memory 314 managed by the chipset 316, other components of platform logic 310, and/or various connections between components of platform logic 310. In various embodiments, the telemetry data collected includes the stress information described herein.

In various embodiments, a manageability engine 326 operates as an out-of-band asynchronous compute agent which is capable of interfacing with the various elements of platform logic 310 to collect telemetry data with no or minimal disruption to running processes on CPUs 312. For example, manageability engine 326 may comprise a dedicated processing element (e.g., a processor, controller, or other logic) on chipset 316, which provides the functionality of manageability engine 326 (e.g., by executing software instructions), thus conserving processing cycles of CPUs 312 for operations associated with the workloads performed by the platform logic 310. Moreover the dedicated logic for the manageability engine 326 may operate asynchronously with respect to the CPUs 312 and may gather at least some of the telemetry data without increasing the load on the CPUs.

A manageability engine 326 may process telemetry data it collects (specific examples of the processing of stress information will be provided herein). In various embodiments, manageability engine 326 reports the data it collects and/or the results of its processing to other elements in the computer system, such as one or more hypervisors 320 or other operating systems and/or system management software (which may run on any suitable logic such as system management platform 306). In particular embodiments, a critical event such as a core that has accumulated an excessive amount of stress may be reported prior to the normal interval for reporting telemetry data (e.g., a notification may be sent immediately upon detection).

Additionally, manageability engine 326 may include programmable code configurable to set which CPU(s) 312 a particular chipset 316 will manage and/or which telemetry data will be collected.

Chipsets 316 also each include a communication interface 328. Communication interface 328 may be used for the communication of signaling and/or data between chipset 316 and one or more I/O devices, one or more networks 308, and/or one or more devices coupled to network 308 (e.g., system management platform 306). For example, communication interface 328 may be used to send and receive network traffic such as data packets. In a particular embodiment, a communication interface 328 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 316 (e.g., manageability engine 326 or switch 330) and another device coupled to network 308. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 328 may allow communication of data (e.g., between the manageability engine 326 and the data center management platform 306) associated with management and monitoring functions performed by manageability engine 326. In various embodiments, manageability engine 326 may utilize elements (e.g., one or more NICs) of communication interfaces 328 to report the telemetry data (e.g., to system management platform 306) in order to reserve usage of NICs of communication interface 318 for operations associated with workloads performed by platform logic 310.

Switches 330 may couple to various ports (e.g., provided by NICs) of communication interface 328 and may switch data between these ports and various components of chipset 316 (e.g., one or more Peripheral Component Interconnect Express (PCIe) lanes coupled to CPUs 312). Switches 330 may be a physical or virtual (i.e., software) switch.

Platform logic 310 may include an additional communication interface 318. Similar to communication interfaces 328, communication interfaces 318 may be used for the communication of signaling and/or data between platform logic 310 and one or more networks 308 and one or more devices coupled to the network 308. For example, communication interface 318 may be used to send and receive network traffic such as data packets. In a particular embodiment, communication interfaces 318 comprise one or more physical NICs. These NICs may enable communication between any suitable element of platform logic 310 (e.g., CPUs 312 or memory 314) and another device coupled to network 308 (e.g., elements of other platforms or remote computing devices coupled to network 308 through one or more networks).

Platform logic 310 may receive and perform any suitable types of workloads. A workload may include any request to utilize one or more resources of platform logic 310, such as one or more cores or associated logic. For example, a workload may comprise a request to instantiate a software component, such as an I/O device driver 324 or guest system 322; a request to process a network packet received from a virtual machine 332 or device external to platform 302A (such as a network node coupled to network 308); a request to execute a process or thread associated with a guest system 322, an application running on platform 302A, a hypervisor 320 or other operating system running on platform 302A; or other suitable processing request.

A virtual machine 332 may emulate a computer system with its own dedicated hardware. A virtual machine 332 may run a guest operating system on top of the hypervisor 320. The components of platform logic 310 (e.g., CPUs 312, memory 314, chipset 316, and communication interface 318) may be virtualized such that it appears to the guest operating system that the virtual machine 332 has its own dedicated components.

A virtual machine 332 may include a virtualized NIC (vNIC), which is used by the virtual machine as its network interface. A vNIC may be assigned a media access control (MAC) address or other identifier, thus allowing multiple virtual machines 332 to be individually addressable in a network.

VNF 334 may comprise a software implementation of a functional building block with defined interfaces and behavior that can be deployed in a virtualized infrastructure. In particular embodiments, a VNF 334 may include one or more virtual machines 332 that collectively provide specific functionalities (e.g., wide area network (WAN) optimization, virtual private network (VPN) termination, firewall operations, load-balancing operations, security functions, etc.). A VNF 334 running on platform logic 310 may provide the same functionality as traditional network components implemented through dedicated hardware. For example, a VNF 334 may include components to perform any suitable NFV workloads, such as virtualized evolved packet core (vEPC) components, mobility management entities, 3rd Generation Partnership Project (3GPP) control and data plane components, etc.

Service function chain (SFC) 336 is a group of VNFs 334 organized as a chain to perform a series of operations, such as network packet processing operations. Service function chaining may provide the ability to define an ordered list of network services (e.g. firewalls, load balancers) that are stitched together in the network to create a service chain.

A hypervisor 320 (also known as a virtual machine monitor) may comprise logic to create and run guest systems 322. The hypervisor 320 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 310. Services of hypervisor 320 may be provided by virtualizing in software or through hardware assisted resources that require minimal software intervention, or both. Multiple instances of a variety of guest operating systems may be managed by the hypervisor 320. Each platform 302 may have a separate instantiation of a hypervisor 320.

Hypervisor 320 may be a native or bare-metal hypervisor that runs directly on platform logic 310 to control the platform logic and manage the guest operating systems. Alternatively, hypervisor 320 may be a hosted hypervisor that runs on a host operating system and abstracts the guest operating systems from the host operating system. Hypervisor 320 may include a virtual switch 338 that may provide virtual switching and/or routing functions to virtual machines of guest systems 322. The virtual switch 338 may comprise a logical switching fabric that couples the vNICs of the virtual machines 332 to each other, thus creating a virtual network through which virtual machines may communicate with each other.

Virtual switch 338 may comprise a software element that is executed using components of platform logic 310. In various embodiments, hypervisor 320 may be in communication with any suitable entity (e.g., a SDN controller) which may cause hypervisor 320 to reconfigure the parameters of virtual switch 338 in response to changing conditions in platform 302 (e.g., the addition or deletion of virtual machines 332 or identification of optimizations that may be made to enhance performance of the platform).

Hypervisor 320 may also include resource allocation logic 344, which may include logic for determining allocation of platform resources based on the telemetry data (which may include stress information). Resource allocation logic 344 may also include logic for communicating with various components of platform logic 310 entities of platform 302A to implement such optimization, such as components of platform logic 310.

Any suitable logic may make one or more of these optimization decisions. For example, system management platform 306; resource allocation logic 344 of hypervisor 320 or other operating system; or other logic of computer platform 302A may be capable of making such decisions. In various embodiments, the system management platform 306 may receive telemetry data from and manage workload placement across multiple platforms 302. The system management platform 306 may communicate with hypervisors 320 (e.g., in an out-of-band manner) or other operating systems of the various platforms 302 to implement workload placements directed by the system management platform.

The elements of platform logic 310 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 302A may be coupled together in any suitable manner such as through one or more networks 308. A network 308 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 4:
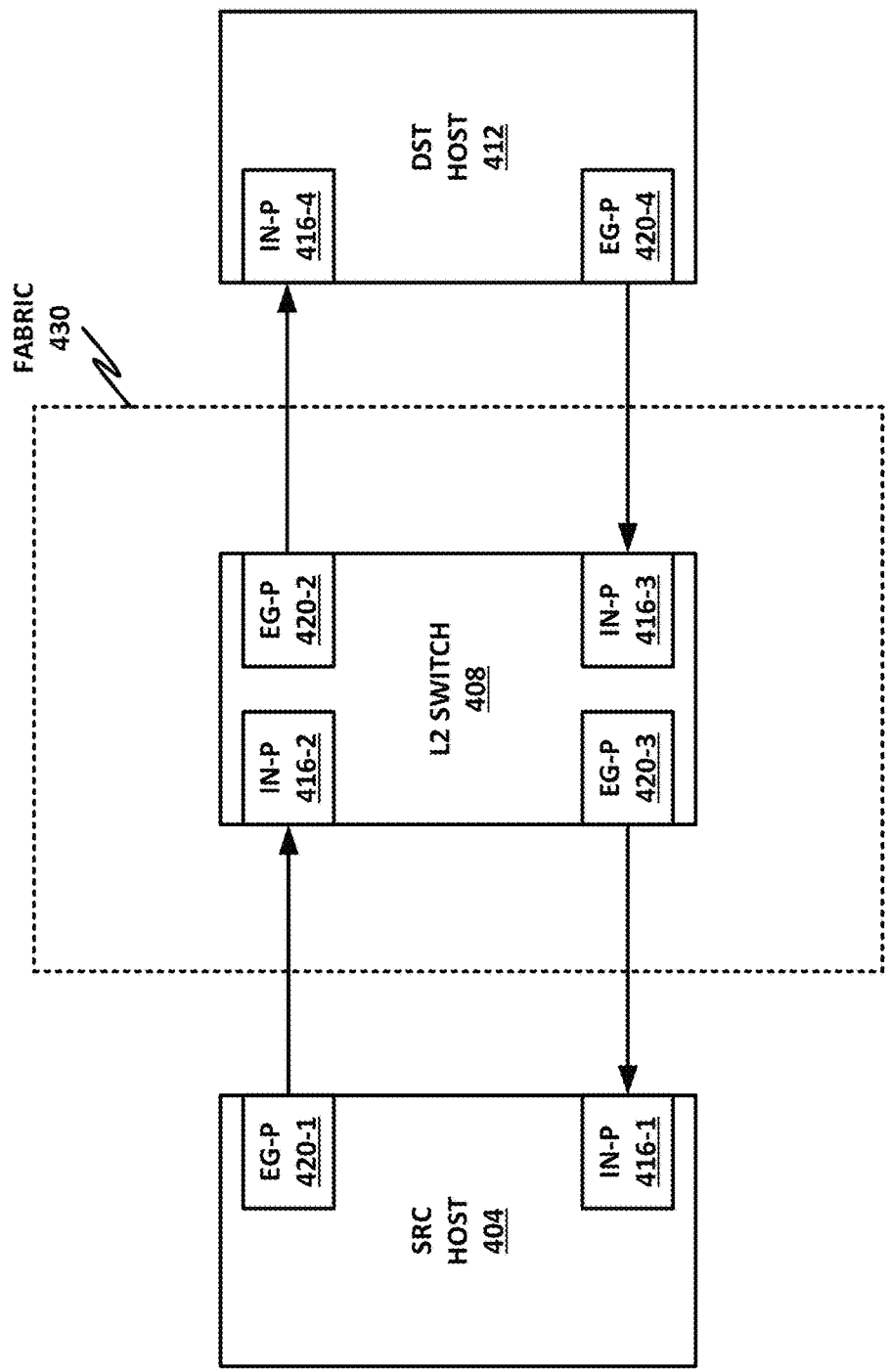
FIG. 4 is a block diagram of selected elements of a data center, according to one or more examples of the present specification.

FIG. 4 is a block diagram of selected elements of a data center, according to one or more examples of the present specification. For purposes of simplicity and focus, only a small number of elements are shown here to illustrate certain operative principles. In this example, a source host 404 communicates with a destination host 412 via L2 switch 408. Note that L2 switch 408 may be only one of numerous switches at various levels within a fabric 430 that services the data center.

In this embodiment, source host 404 has egress port 420-1, which communicatively couples to L2 switch 408 via ingress port 416-2. Egress port 420-3 of L2 switch 408 communicatively couples to ingress port 416-1 of source host 404. Similarly, egress port 420-2 of L2 switch 408 communicatively couples to ingress port 416-4 of destination host 412. Egress port 420-4 of destination host 412 communicatively couples to ingress port 416-3 of L2 switch 408.

Note that in this illustration, source host 404 and destination host 412 are shown in direct point-to-point connection to L2 switch 408. This illustration is provided for the purpose of simplicity and to demonstrate certain operative principles of the present specification. It should be understood that fabric 430 may include many switches, including L2 and Layer 3 (L3) switches of various types, and that L2 switch 408 may be one or more hops away from one or both of source host 404 and destination host 412.

When source host 404 needs to communicate with destination host 412, source host 404 may place a packet in a queue for egress port 420-1. Egress port 420-1 services the queue, and when the packet comes up in the queue, egress port 420-1 forwards the packet to ingress port 416-2 of L2 switch 408. Note that the packet may be sent via a particular virtual lane (VL) or virtual channel (VC) that may be assigned to a particular service level (SL) or traffic class (TC). L2 switch 408 inspects the incoming packet, and to send the packet to destination host 412, assigns the packet to egress port 420-2. Note that egress port 420-2 may be only one of many egress ports on L2 switch 408.

Egress port 420-2 may similarly have a queue, and once the packet comes up in the queue, egress port 420-2 forwards the packet to ingress port 416-4 of destination host 412. Destination host 412 may then process the packet, and may send an ACK or RESP packet to source host 404. To do so, destination host 412 places the RESP packet in a queue for egress port 420-4. When the packet comes up in the queue of egress port 420-4, egress port 420-4 forwards the packet to ingress port 416-3 of L2 switch 408.

L2 switch 408 inspects the packet, and determines that it is destined for source host 404. L2 switch 408 therefore assigns the packet to a queue for egress port 420-3. When the RESP packet comes up in the queue of egress port 420-3, egress port 420-3 forwards the RESP packet to ingress port 416-1 of source host 404.

Figure 5:
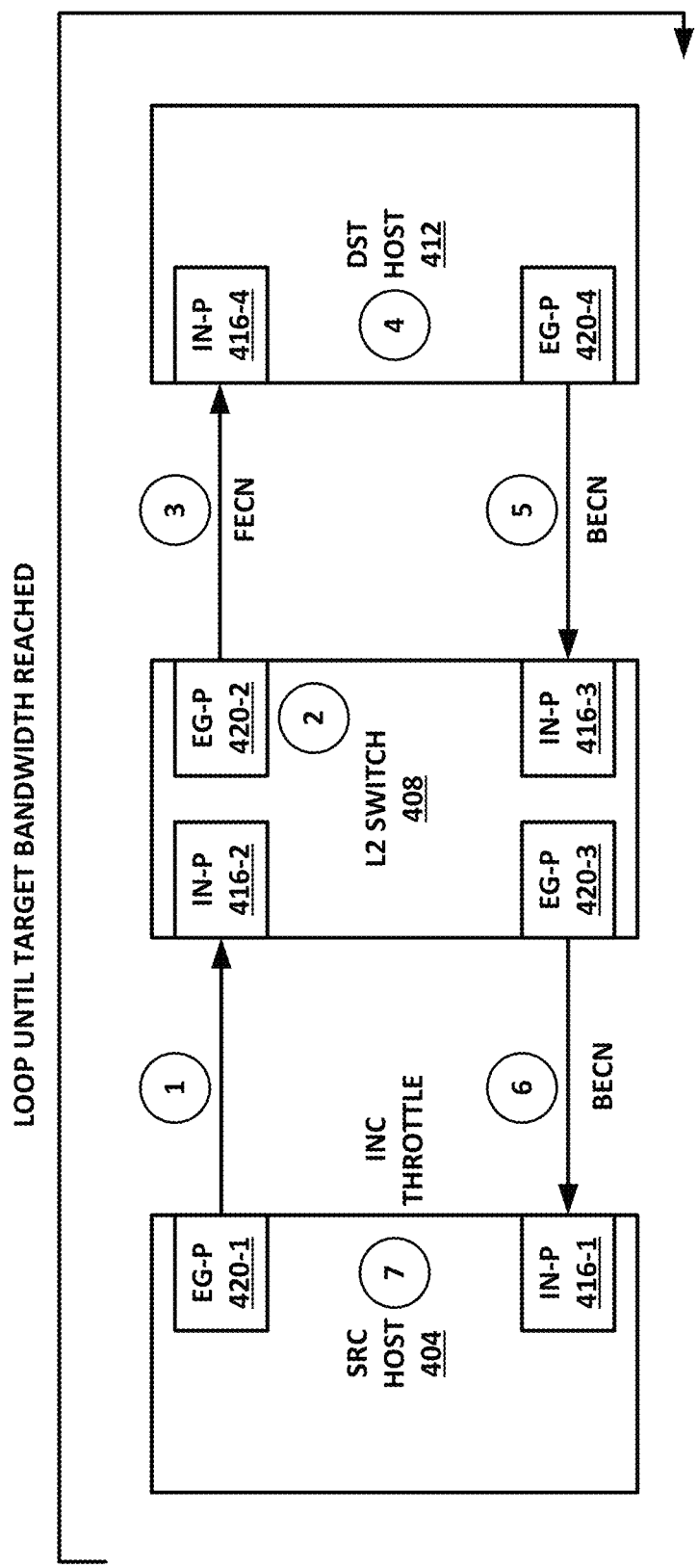
FIG. 5 illustrates an example of signal flows that may occur if a source host oversubscribes the virtual lane that the packet is provided on, according to one or more examples of the present specification.

Building on the example of FIG. 4, FIG. 5 illustrates an example of signal flows that may occur if source host 404 oversubscribes the virtual lane that the packet is provided on.

At operation 1, source host 404 sends the packet to L2 switch 408 via egress port 420-1 and ingress port 416-2.

At operation 2, L2 switch 408 analyzes the packet, and may determine that source host 404 has oversubscribed the virtual lane that the packet belongs to. Thus, L2 switch 408 may set a FECN bit on the packet.

At operation 3, L2 switch 408 forwards the packet with the FECN bit set to destination host 412 via egress port 420-2 and ingress port 416-4.

At operation 4, destination host 412 processes the packet, and observes that the FECN bit is set. Thus, destination host 412 may build a RESP packet or an ACK, and may set the BECN bit for the RESP packet.

At operation 5, destination host 412 forwards the RESP packet to L2 switch 408 via egress port 420-4 and ingress port 416-3. This packet has the BECN bit set.

At operation 6, L2 switch 408 determines that the RESP packet is destined for source host 404, and thus assigns the packet to egress port 420-3. L2 switch 408 forwards the RESP packet with the BECN bit set to source host 404 via egress port 420-3 and ingress port 416-1.

At operation 7, source host 404 observes in software that the BECN bit is set, and thus determines that its usage of the virtual lane needs to be throttled. Source host 404 performs an incremental throttle, for example, by a quantum throttle amount, for its next packet on the virtual lane.

As illustrated in this figure, this may continue in a loop until source host 404 reaches the target traffic capacity for the virtual lane it is operating. This may require several iterations through the loop before the virtual lane reaches the target capacity. Furthermore, the loop requires or may require numerous packets to continue to be passed on the oversubscribed virtual lane, thus actually contributing to the congestion. Furthermore, the one or more of the packets with the FECN bit or BECN bit set may be dropped on the congested virtual lane, and thus incremental throttling opportunities may be missed, thus requiring additional iterations through the loop.

Figure 6:
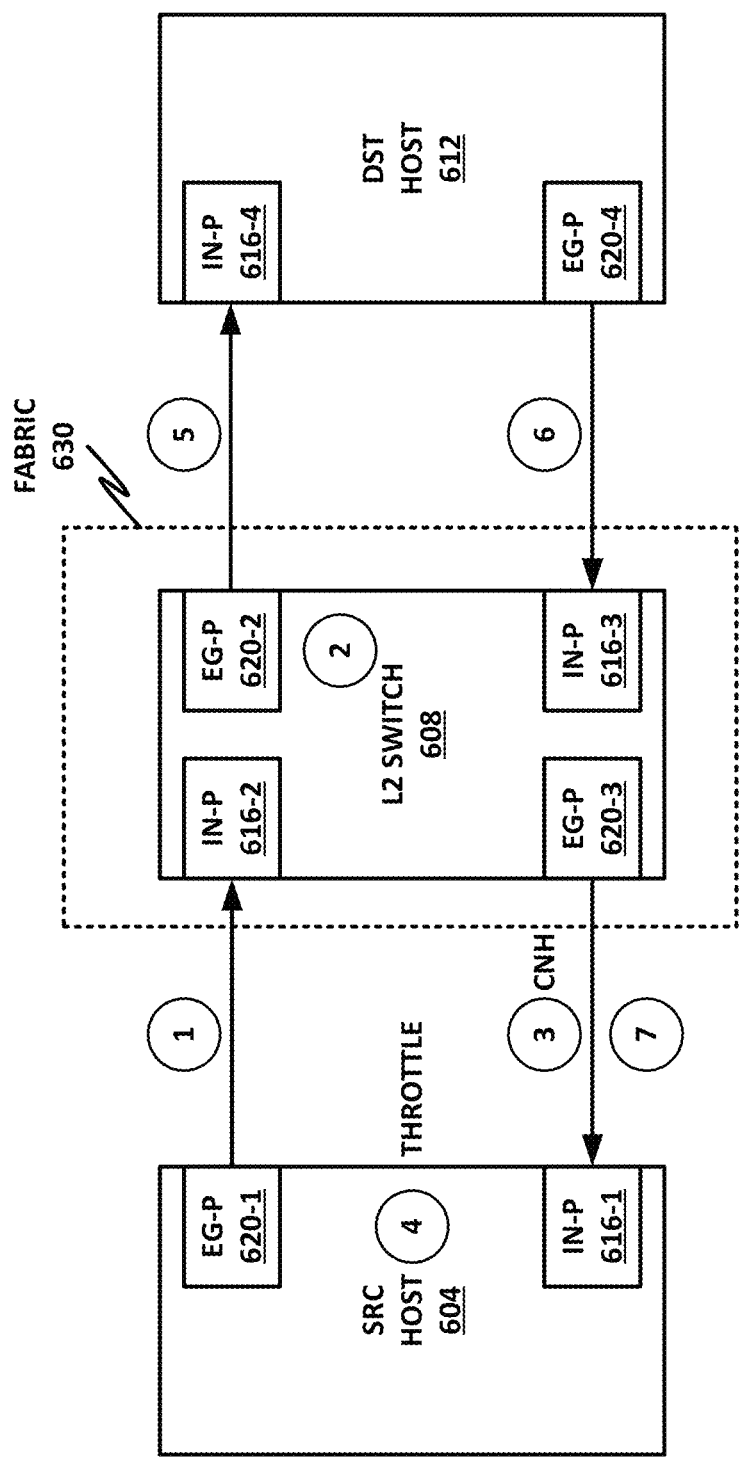
FIG. 6 illustrates a signal flow in which operations are improved upon by the use of a fast congestion response, according to one or more examples of the present specification.

FIG. 6 illustrates a signal flow in which the operations illustrated in FIG. 5 are improved upon by the use of a fast congestion response system as described in this specification.

Advantageously, the fast congestion system provided in FIG. 6 is transport agnostic. Because the network fabric may potentially support several transports, such as transmission control protocol/Internet protocol (TCP/IP) and user datagram protocol (UDP), and other HPC transports like Verbs, performance scale messaging (PSM), or Portals, it is advantageous to provide a fundamentally uniform low level solution (such as L2) for congestion response. This congestion response model can be agnostic of the transport layer, and the transport layer need not be aware of the congestion response model. Advantageously, this also plays well with the coexistence of several transports in a particular fabric at the same time. Thus, by providing congestion response at L2, the congestion response is transport agnostic.

Further advantageously, the congestion response to some of FIG. 6 is fine-grained. This ensures fairness, and avoids, for example, throttling the victim in addition to the aggressor (e.g., source host 604). The congestion response system of the present specification is designed to throttle only flows that contribute to the root of the congestion. At a high level, this can be accomplished by carefully identifying and notifying the flows that own service levels and service channels that cause congestion.

Further advantageously, the fast congestion response system of FIG. 6 is low latency. This system responds to congestion at the "first sight" switch module, as opposed to incurring a full round-trip between the sender and receiver. At a minimum, this solution eliminates the need for receive side (i.e., at the destination node) queuing or processing delay and response latency. Furthermore, depending on the proximity of the first sight switch to the source node, the system may incur latency of only one switch hop and completely eliminate the remaining n−1 hop latency towards the response.

This eliminates receive side host involvement and delay incurred at the receive side host. It also minimizes the number of hops in the network before the sender starts to see congestion notification.

As in FIGS. 4 and 5, FIG. 6 includes a source host 604 and a destination host 612. These are communicatively coupled to one another via a fabric 630. Fabric 630 includes one or more L2 switches 608. In this illustration, only one L2 switch 608 is shown for simplicity and to illustrate the operative principles. However, in practice, many more L2 switches may be provided.

As before, source host 604 sends a packet to destination host 612.

At operation 1, source host 604 sends the packet to L2 switch 608 via egress port 620-1 and ingress port 616-2.

At operation 2, as before, L2 switch 608 assigns the packet to an egress port 620-2 that communicatively couples to destination host 612. L2 switch 608 also analyzes the virtual lane and determines that the flow that the packet belongs to has oversubscribed the virtual lane.

At operation 3, L2 switch 608 generates a CNH, and sends the CNH directly to source host 604 via egress port 620-3 and ingress port 616-1. The CNH may include the L2 header of the original packet, with the source address and destination address swapped. The CNH may also include a source flow identifier, so that source host 604 knows which flow the CNH is addressing. Finally, the CNH may include a quantitative flow throttle, which is a value by which the source host 604 is to throttle the virtual lane that the flow belongs to. Note that the CNH may not have an ordinary payload, but may instead be a FlowDigiT (or "flit") with a CNH bit set in the header, so that source host 604 knows to process the CNH without looking for an actual payload.

In operation 4, source host 604 throttles the virtual lane that the flow belongs to, and may continue sending packets at the new throttled rate.

In parallel to operations 3 and 4, at operation 5, L2 switch 608 may forward the original packet to destination host 612 via egress port 620-2 and ingress port 616-4.

Destination host 612 need not be aware of the throttling. Rather, destination host 612 can continue to respond to packets on the flow as they come in. Because these packets will come in at the new throttled rate, the virtual lane that the packets belong to will not be oversubscribed.

At operation 6, destination host 612 sends a RESP packet to source host 604, by forwarding the RESP packet to L2 switch 608 via egress port 620-4 and ingress ports 616-3.

At operation 7, L2 switch 608 forwards the RESP packet to source host 604 via egress port 620-3 and ingress port 616-1.

Note that at operation 5, L2 switch 608 had no need to append a FECN bit to the packet, and at operations 6 and 7, the RESP packet does not require a BECN bit.

Figure 7A:
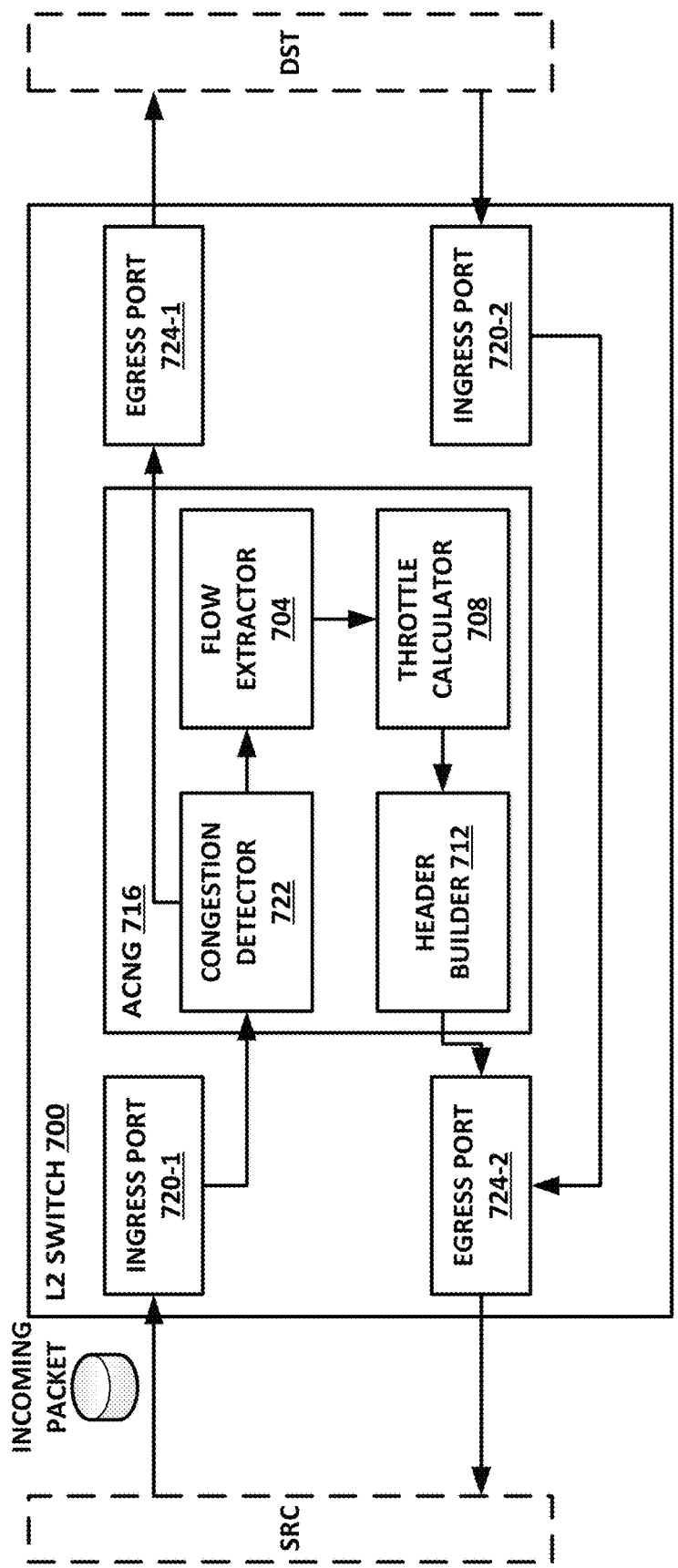
FIGS. 7a-7b are a block diagram of a Layer 2 (L2) switch, according to one or more examples of the present specification.
Figure 7B:
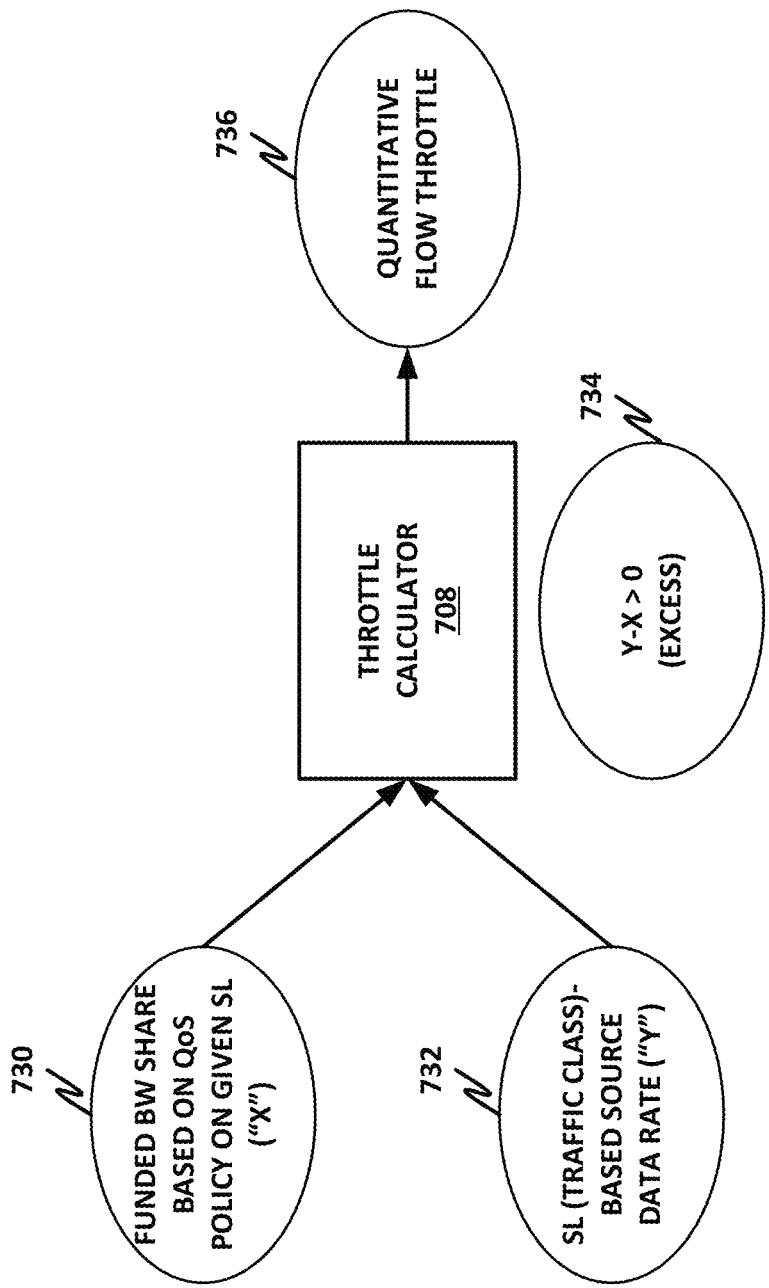

FIGS. 7a-7b are a block diagram of an L2 switch, according to one or more examples of the present specification. As before, selected elements of L2 switch 700 are illustrated herein for purposes of simplicity and to illustrate certain operative principles.

In this example, L2 switch 700 includes ingress port 720-1, egress port 724-1, ingress port 720-2, and egress port 724-2. L2 switch 700 also includes an automatic congestion notification generator (ACNG) 716.

L2 switch 700 may receive an incoming packet from a source device, which is to be directed to a destination device. The incoming packet may or may not belong to a flow on a virtual lane that is oversubscribed. If the virtual lane that the packet belongs to is oversubscribed, then ACNG 716 may be configured to take corrective action.

When the incoming packet hits ingress port 720-1, the packet may be evaluated by ACNG 716. Note that ACNG 716 is illustrated herein as a separate block. ACNG 716 may be a single monolithic ACNG that services the entire L2 switch 700, or a single ACNG may be provided per ingress port or egress port so that packets can be evaluated on a per-port basis. Thus, throughout this specification and the appended claims, it should be understood that ACNG 716 provides a logical division for the functions provided by ACNG 716, and is not intended to imply that ACNG 716 must be a separate hardware, software, and/or firmware module from ingress ports 720 and/or egress ports 724. One common embodiment is to have an ACNG 716 associated with one or more egress ports 724.

ACNG 716 includes a congestion detector 722. Congestion detector 722 determines whether the incoming packet belongs to a virtual lane or a virtual channel that is oversubscribed. If the virtual lane or virtual channel is not oversubscribed, then ACNG 716 can simply direct the packet to egress port 724-1, and the packet can be forwarded to its destination.

If congestion detector 722 determines that the packet belongs to a congested virtual lane or virtual channel, then the packet may be provided to flow extractor 704. Flow extractor 704 parses the header of the incoming packet to determine which flow the packet belongs to. Flow extractor 704 can compare this flow to a service level for the virtual lane, virtual channel, or traffic class that the flow belongs to, to determine whether and by how much the flow is oversubscribed to the fabric.

Throttle calculator 708 is provided to calculate a quantitative flow throttle value that can be used by an HFI on the source device to scale back its use of the fabric to conform to the required service level. Additional details of one example of a throttle calculator 708 are provided in FIG. 7B.

Header builder 712 builds a CNH to instruct the HFI of the source device to throttle back its use of the fabric on that flow. As described above, a CNH may include or may be a flit, in which a CNH bit is set to instruct the HFI not to expect a payload for the packet. Rather, the HFI is simply to evaluate the CNH itself. By way of nonlimiting example, the CNH may include the L2 header, with the source address and destination address swapped. The CNH may also include a source flow identifier so that the HFI knows which flow to throttle, and the CNH may include a quantitative flow throttle value so that the HFI knows by how much to throttle the flow.

FIG. 7B illustrates additional details of throttle calculator 708, including details of one example of how throttle calculator 708 may determine that a flow is to be throttled, and can calculate how much to throttle the flow by.

In the embodiment of FIG. 7B, the congestion may be detected at an egress port 724 with its own dedicated ACNG 716, or with access to a single ACNG for the L2 switch.

The port enters into a congested state when the virtual lane buffer either is full or exceeds a set threshold to trigger congestion. Assume, for example, that each service level or traffic class maps to a virtual lane. Note that in embodiments of many L2 switches, there may be a finite number of service levels, traffic classes, and virtual lanes for a given port, such as eight available traffic classes. Each virtual lane has its own queue (i.e., the buffer queue) which determines the order in which packets will egress from the output port.

Throttle calculator 708 may have a counter for the number of virtual lane buffer entries used by a given service level.

The switch hardware may be expected to maintain a running update on that counter. In other words, the counter may be incremented when the packet enters the queue, and decremented when the packet exits the queue at the assigned egress port. Based on this counter value, the percentage of the "full" data rate for that virtual lane may be determined based on the port that the particular service level is using. In a congested state, if the utilization value for the service lane is higher than the guaranteed minimum bandwidth promised, then it is fine to throttle the flow belonging to that service level in the source by throttling it to some percentage while still meeting the QoS guarantee. If the QoS is not required but multiple sources share the bandwidth of the port, then the switch could allow each source no more than the maximum bandwidth divided by the number of sources, in which case an individual source may exceed the limit throttle even though it is not by itself oversubscribed in the fabric.

Block 732 is thus a service level for a particular traffic class. This computation is based on the source data rate as described above, and is assigned a variable Y.

Block 730 includes a variable X, which is computed on the allocated bandwidth share based on the QoS policy on a given service level.

These variables X and Y are provided to throttle calculator 708. Throttle calculator 708 computes the difference between Y and X, and determines whether it is greater than 0. If Y−X is greater than 0, then the difference is the amount that the switch can allocate based on other current sources, with the QoS constraints.

Thus, throttle calculator 708 can compute a quantitative flow throttle 736 based on the difference between Y and X.

Figure 8:
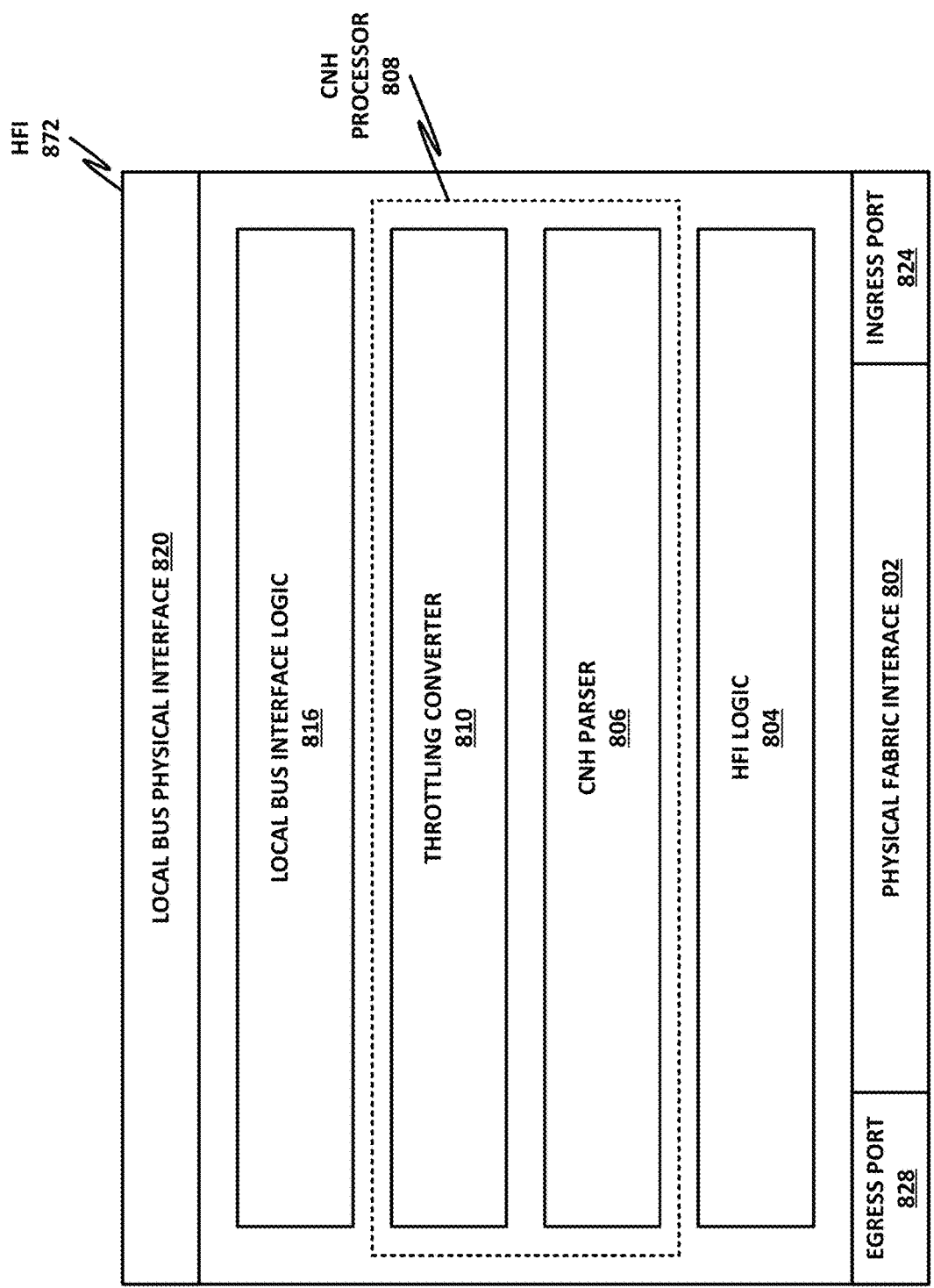
FIG. 8 is a block diagram of an example host fabric interface (HFI), according to one or more examples of the present specification.

FIG. 8 is a block diagram of an example HFI 872, according to one or more examples of the present specification. This HFI 872 is provided by way of nonlimiting example only. It should be noted in particular that HFI 872 may be a separate pluggable card, such as a PCIe card, or it may be tightly integrated and on-die with its host core. Furthermore, while HFI 872 is disclosed herein as the medium for hosting remote hardware acceleration functions, these functions could just as well be hosted in another part of the machine. For example, a dedicated RHA chip could be provided, which itself could be very much like a hardware accelerator. Functions could be performed on a hardware block integrated into the core, or these functions could be performed in software on the core. Thus, the disclosure of remote hardware acceleration functions on HFI 872 in this figure should be understood as a nonlimiting and illustrative example only, and the present disclosure should be understood to encompass any suitable hardware or software configuration for realizing remote hardware acceleration.

In this example, HFI 872 includes two physical interfaces, namely a local bus physical interface 820 and a physical HFI 802.

Local bus interface 820 may provide a physical interface to a local bus on the host, such as a PCIe interface or other local interconnect. Local bus physical interface 820 is provided as a nonlimiting example, and it should be understood that other interconnect methods are possible. For example, in cases where HFI 872 is tightly coupled with its accompanying core, local bus physical interface 820 could be direct, on-die trace lines, or direct copper connections on an integrated circuit board. In other examples, a bus interface other than PCIe could be used.

Physical HFI 802 provides the physical interconnect to a fabric, such as fabric 170 of FIG. 1 or any of the fabrics disclosed herein. Physical HFI 802 may be configured to connect HFI 872 to any suitable fabric.

In one particular example, the Intel® Omni-Path™ fabric may be used. The Omni-Path™ fabric is advantageous because it allows mapping of addresses and memory ranges between different coherent domains. A system may include one or more coherent domains wherein all coherent domains are connected to each other via a fabric. Caching agents are the coherency agents within a node that process memory requests from cores within the same node, thus providing the coherency of the domain. Home agents are node clusters that are responsible for processing memory requests from the caching agents, and act as a home for part of the memory address space. A single die may have multiple homes, having a distributed address space mapping. Depending on the address space that the request targets, the request may go to the same node's local memory or they may go to a UPI agent, for example, to route the request to other processors within the same coherent domain. Alternately, a request may go through the HFI 872 to processors that are outside the coherent domain. All processors connected via the UPI belong to the same coherent domain. Thus, in one embodiment, HFI 872 may communicate with an Omni-Path™ fabric via UPI tunneling.

This communication may be facilitated via HFI logic 804, which provides logic elements and instructions necessary to provide communication within a coherent domain, and across the fabric with different coherent domains. HFI logic 804 may also include logic to translate local requests into remote fabric requests.

On the other hand, local bus interface logic 816 may provide logic for interfacing with the local bus, such as a PCIe bus, or a dedicated copper connection. Alternately, traffic through HFI 872 may follow a path through local bus physical interface 820, local bus interface logic 816, HFI logic 804, and physical HFI 802 out to the fabric.

Note that ingress port 824 and egress port 828 may each have their own queues. Ingress port 824 is configured to receive traffic from the fabric, while egress port 828 is configured to send traffic to the fabric.

CNH processor 808 includes CNH parser 806 and throttling converter 810. CNH parser 806 may be configured to parse the fields in a CNH as described in this specification. This can include parsing out source address, destination address, source flow identifier, and quantitative flow throttle value.

Throttling converter 810 may be configured to convert the quantitative flow throttle to a local value usable within HFI 872. For example, throttling converter 810 may convert the quantitative flow throttle value into an interpacket delay or interpacket gap. This enables CNH processor 808 to realize the quantitative flow throttle as directed by the fabric.

Figure 9:
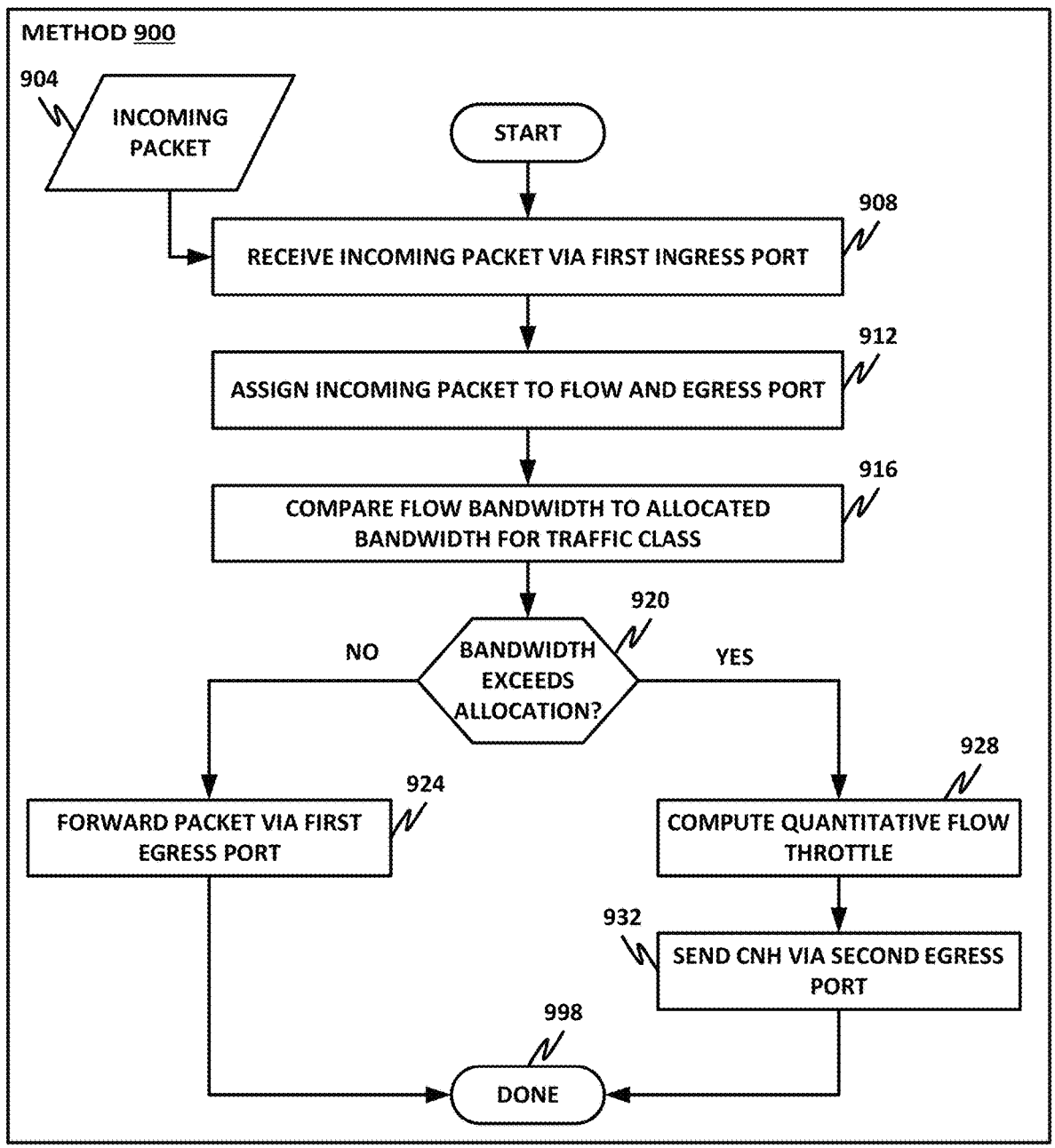
FIG. 9 is a flowchart of a method which may be performed by an L2 switch within the fabric, according to one or more examples of the present specification.

FIG. 9 is a flowchart of a method 900 which may be performed, for example, by an L2 switch within the fabric, according to one or more examples of the present specification.

In block 908, the L2 switch receives an incoming packet 904 via a first ingress port.

In block 912, the L2 switch may assign the incoming packet to a particular flow, and thus direct the packet to an egress port that services that flow.

In block 916, for example, before the packet is queued for the egress port, a suitable hardware or software element such as an ACNG may compare the flow bandwidth to the allocated bandwidth for the traffic class that the flow belongs to.

In decision block 920, the L2 switch determines whether the bandwidth usage exceeds the bandwidth allocation for the flow, such as by the method illustrated in FIG. 7B, or by any other suitable method.

If the bandwidth does not exceed allocation, then in block 924, the L2 switch may forward the packet via the first egress port and in block 998, the method is done.

Returning to decision block 920, if the bandwidth usage does exceed the allocation, then in block 928, the L2 switch may compute a quantitative flow throttle value for throttling the flow.

In block 932, the L2 switch may build a CNH packet, and forward the CNH packet back to the source of incoming packet 904 via a second egress port.

In block 998, the method is done.

Figure 10:
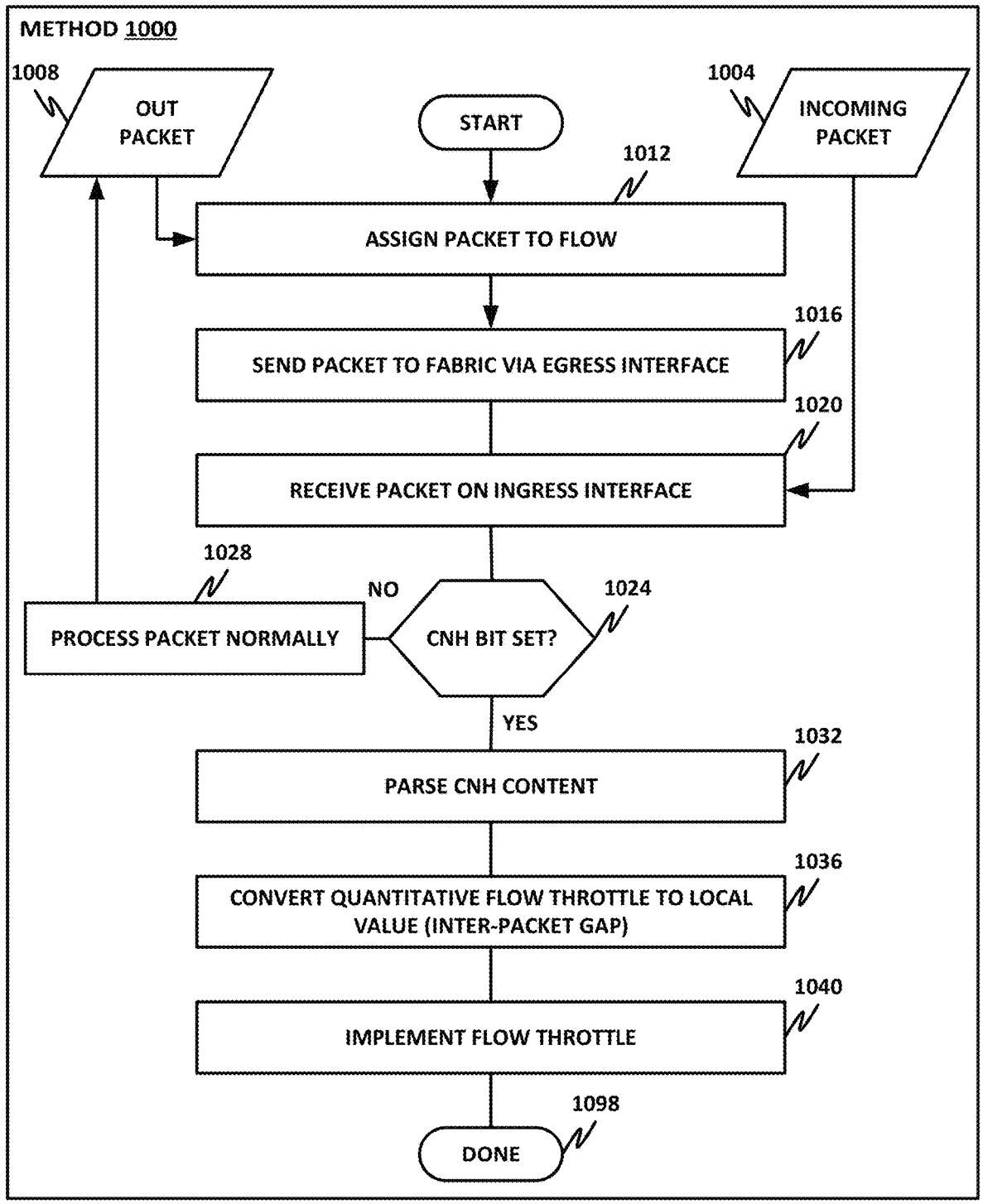
FIG. 10 is a flowchart of a method that may be performed by an HFI with a congestion notification header (CNH) processor element, or by any other suitable device or software, according to one or more embodiments of the present specification.

FIG. 10 is a flowchart of a method 1000 that may be performed, for example, by an HFI with a CNH processor element, or by any other suitable device or software, according to one or more embodiments of the present specification.

In block 1012, the HFI generates an outgoing packet 1008.

In block 1016, the CNH sends the outgoing packet to the fabric via its egress interface.

In block 1020, the HFI may receive an incoming packet 1004 via its ingress interface.

In decision block 1024, the HFI checks to determine whether the incoming packet has its CNH bit set.

If the CNH bit is not set, then the incoming packet is a normal packet, and in block 1028, the HFI processes the packet normally, and then continues to generate output packets 1008 for the flow.

Returning to decision block 1024, if the CNH bit is set, then in block 1032, the HFI parses the CNH bit content of the congestion notification header. This can include parsing out, for example, the source address, destination address, source flow identifier, and quantitative flow throttle value.

In block 1036, the HFI converts the quantitative flow throttle value to a locally usable value such as an interpacket delay or interpacket gap.

In block 1040, the HFI implements the flow throttle, for example, by inserting the interpacket delay or interpacket gap between packets within the flow, thus ensuring that the output of packets in the flow conforms to the required throttle value. In block 1098, the method is done.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the FIGURES may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other non-volatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

The following examples are provided by way of illustration.

Example 1 includes an example of a switch, comprising: an ingress port to receive data from a source host; a first egress port to send data to a destination host; a second egress port to send data to the source host; and a congestion notification generator (CNG) module comprising: a congestion detector to compute bandwidth consumption of a flow associated with a packet received on the ingress port and assigned to the first egress port, and determine based on the computed bandwidth consumption that the flow is congested; a flow extractor to extract a flow identifier of the flow from the packet; a throttle calculator to calculate a quantitative flow throttle value for the flow; and a header builder to build a congestion notification packet configured to instruct the source device to throttle the flow.

Example 2 includes the switch of example 1, wherein the computed bandwidth consumption is based at least in part on a quality of service or service level agreement.

Example 3 includes the switch of example 1, wherein the congestion notification packet comprises a congestion notification header (CNH) flag that is set, and a CNH comprising an L2 source, L2 destination, the flow identifier, and the quantitative flow throttle value.

Example 4 includes the switch of example 1, wherein the switch is to send the congestion notification packet to the source device via the second egress port.

Example 5 includes the switch of example 1, wherein the quantitative flow throttle value is to achieve a throttling target in a single iteration.

Example 6 includes the switch of example 1, wherein the flow is associated with a traffic class, and wherein the quantitative flow throttle value is to conform the flow to a bandwidth allocation for the traffic class.

Example 7 includes the switch of example 1, wherein the CNG module is transport agnostic.

Example 8 includes the switch of example 1, wherein computing the quantitative flow throttle value comprises computing a difference between Y comprising a source data rate for a service level of a traffic class, and X comprising a funded bandwidth share for the service level based on a quality of service policy.

Example 9 includes a congestion notification generator (CNG) module comprising: a congestion detector to compute bandwidth consumption of a flow associated with a packet received on an ingress port and assigned to a first egress port, and determine based on the computed bandwidth consumption that the flow is congested; a flow extractor to extract a flow identifier of the flow from the packet; a throttle calculator to calculate a quantitative flow throttle value for the flow; and a header builder to build a congestion notification packet configured to instruct the source device to throttle the flow.

Example 10 includes the CNG module of example 9, wherein the computed bandwidth consumption is based at least in part on a quality of service or service level agreement.

Example 11 includes the CNG module of example 9, wherein the congestion notification packet comprises a congestion notification header (CNH) flag that is set, and a CNH comprising an L2 source, L2 destination, the flow identifier, and the quantitative flow throttle value.

Example 12 includes the CNG module of example 9, wherein the CNG module is to send the congestion notification packet to the source device via the second egress port.

Example 13 includes the CNG module of example 9, wherein the quantitative flow throttle value is to achieve a throttling target in a single iteration.

Example 14 includes the CNG module of example 9, wherein the flow is associated with a traffic class, and wherein the quantitative flow throttle value is to conform the flow to a bandwidth allocation for the traffic class.

Example 15 includes the CNG module of example 9, wherein the CNG module is transport agnostic.

Example 16 includes the CNG module of example 9, wherein computing the quantitative flow throttle value comprises computing a difference between Y comprising a source data rate for a service level of a traffic class, and X comprising a funded bandwidth share for the service level based on a quality of service policy.

Example 17 includes an application-specific integrated circuit (ASIC) comprising the CNG module of any of examples 9-16.

Example 18 includes a field-programmable gate array (FPGA) comprising the CNG module of any of examples 9-16.

Example 19 includes one or more tangible, non-transitory computer-readable mediums having stored thereon instructions to program a field-programmable gate array (FPGA) to provide the CNG module of any of examples 9-16.

Example 20 includes an intellectual property (IP) block comprising the CNG module of any of examples 9-16.

Example 21 includes one or more tangible, non-transitory computer-readable mediums having stored thereon executable instructions to instruct a processor to provide the CNG module of any of examples 9-16.

Example 22 includes a method of providing fast congestion response, comprising: computing a bandwidth consumption of a flow associated with a packet received on an ingress port and assigned to a first egress port; determining based on the computed bandwidth consumption that the flow is congested; extracting a flow identifier of the flow; calculating a quantitative flow throttle value for the flow; and building a congestion notification packet configured to instruct the source device to throttle the flow.

Example 23 includes the method of example 22, wherein the computed bandwidth consumption is based at least in part on a quality of service or service level agreement.

Example 24 includes the method of example 22, wherein the congestion notification packet comprises a congestion notification header (CNH) flag that is set, and a CNH comprising an L2 source, L2 destination, the flow identifier, and the quantitative flow throttle value.

Example 25 includes the method of example 22, further comprising sending the congestion notification packet to the source device via the second egress port.

Example 26 includes the method of example 22, wherein the quantitative flow throttle value is to achieve a throttling target in a single iteration.

Example 27 includes the method of example 22, wherein the flow is associated with a traffic class, and wherein the quantitative flow throttle value is to conform the flow to a bandwidth allocation for the traffic class.

Example 28 includes the method of example 22, wherein the CNG module is transport agnostic.

Example 29 includes the method of example 22, wherein computing the quantitative flow throttle value comprises computing a difference between Y comprising a source data rate for a service level of a traffic class, and X comprising a funded bandwidth share for the service level based on a quality of service policy.

Example 30 includes an application-specific integrated circuit (ASIC) configured to perform the method of any of examples 22-29.

Example 31 includes a field-programmable gate array (FPGA) configured to perform the method of any of examples 22-29.

Example 32 includes one or more tangible, non-transitory computer-readable mediums having stored thereon instructions to program a field-programmable gate array (FPGA) to perform the method of any of examples 22-29.

Example 33 includes an intellectual property (IP) block configured to perform the method of any of examples 22-29.

Example 34 includes one or more tangible, non-transitory computer-readable mediums having stored thereon executable instructions to instruct a processor to perform the method of any of examples 22-29.

Example 35 includes a host fabric interface, comprising: an ingress port; an egress port; flow logic to send a flow to a destination via the egress port; and a congestion notification packet processor to receive a congestion notification packet via the ingress port, and throttle the flow according to the congestion notification packet.

Example 36 includes the host fabric interface of example 35, wherein the congestion notification packet comprises a congestion notification header (CNH) bit, and a CNH.

Example 37 includes the host fabric interface of example 36, wherein the CNH comprises a flow identifier and a quantitative flow throttle value.

Example 38 includes the host fabric interface of example 37, wherein throttling the flow according to the congestion notification packet comprises converting the quantitative flow throttle value to an interpacket delay (IPD) or interpacket gap (IPG).

Example 39 includes the host fabric interface of any of examples 35-38, wherein the congestion notification packet processor comprises an intellectual property (IP) block.

Example 40 includes the host fabric interface of any of examples 35-38, wherein the congestion notification packet processor comprises a field-programmable gate array (FPGA).

Example 41 includes one or more tangible, non-transitory computer-readable mediums having stored thereon instructions to program a field-programmable gate array (FPGA) to provide the congestion notification packet processor of any of examples 35-38.

Example 42 includes one or more tangible, non-transitory computer-readable mediums having stored thereon executable instructions to instruct a host fabric interface to provide the congestion notification packet processor of any of examples 35-38.

Example 43 includes one or more tangible, non-transitory computer-readable storage mediums having stored thereon instructions to instruct a computing apparatus to: compute a bandwidth consumption of a flow associated with a packet received on an ingress port and assigned to a first egress port; determine based on the computed bandwidth consumption that the flow is congested; extract a flow identifier of the flow; calculate a quantitative flow throttle value for the flow; and build a congestion notification packet configured to instruct the source device to throttle the flow.

Example 44 includes the one or more tangible, non-transitory computer-readable mediums of example 43, wherein the computed bandwidth consumption is based at least in part on a quality of service or service level agreement.

Example 45 includes the one or more tangible, non-transitory computer-readable mediums of example 43, wherein the congestion notification packet comprises a congestion notification header (CNH) flag that is set, and a CNH comprising an L2 source, L2 destination, the flow identifier, and the quantitative flow throttle value.

Example 46 includes the one or more tangible, non-transitory computer-readable mediums of example 43, wherein the instructions are further to send the congestion notification packet to the source device via the second egress port.

Example 47 includes the one or more tangible, non-transitory computer-readable mediums of example 43, wherein the quantitative flow throttle value is to achieve a throttling target in a single iteration.

Example 48 includes the one or more tangible, non-transitory computer-readable mediums of example 43, wherein the flow is associated with a traffic class, and wherein the quantitative flow throttle value is to conform the flow to a bandwidth allocation for the traffic class.

Example 49 includes the one or more tangible, non-transitory computer-readable mediums of example 43, wherein the instructions are to operate in a layer 3 (L3) transport-agnostic fashion.

Example 50 includes the one or more tangible, non-transitory computer-readable mediums of example 43, wherein computing the quantitative flow throttle value comprises computing a difference between Y comprising a source data rate for a service level of a traffic class, and X comprising a funded bandwidth share for the service level based on a quality of service policy.

Example 51 includes the one or more tangible, non-transitory computer-readable mediums of example 43, wherein the instructions comprise instructions to program a field-programmable gate array (FPGA).

Example 52 includes the one or more tangible, non-transitory computer-readable mediums of example 43, wherein the instructions comprise instructions to program an application-specific integrated circuit (ASIC).

Example 53 includes the one or more tangible, non-transitory computer-readable mediums of example 43, wherein the instructions comprise instructions to program an intellectual property (IP) block.

Example 54 includes the one or more tangible, non-transitory computer-readable mediums of example 43, wherein the instructions comprise software instructions for a processor.

What is claimed is:

1. A switch, comprising:
an ingress port;
first and second egress ports; and circuitry to:
compute bandwidth consumption of a flow associated with a packet received from a source host on the ingress port and assigned to a destination host communicatively coupled to the first egress port, and determine based on the computed bandwidth consumption that the flow is congested;
extract a flow identifier of the flow from the packet;
calculate a quantitative flow throttle value for the flow; and
build a packet to instruct the source host to throttle the flow; and
send the packet to the source host via the second egress port.

2. The switch of claim 1, wherein the switch is to provide layer 2 (L2) switching services.

3. The switch of claim 1, wherein the computed bandwidth consumption is based at least in part on a quality of service or service level agreement.

4. The switch of claim 1, wherein the packet comprises a congestion notification header (CNH) flag that is set, and a CNH comprising an L2 source, L2 destination, the flow identifier, and the quantitative flow throttle value.

5. The switch of claim 4, wherein the L2 source is to send the packet to the source host via the second egress port.

6. The switch of claim 1, wherein the quantitative flow throttle value is to realize a throttling target in a single iteration.

7. The switch of claim 1, wherein the flow is associated with a traffic class, and wherein the quantitative flow throttle value is to conform the flow to a bandwidth allocation for the traffic class.

8. The switch of claim 1, wherein computing the quantitative flow throttle value comprises computing a difference between Y comprising a source data rate for a service level of a traffic class, and X comprising a funded bandwidth share for the service level based on a quality of service policy.

9. One or more tangible, non-transitory computer-readable storage mediums having stored thereon instructions to instruct a computing apparatus to:
    compute a bandwidth consumption of a flow associated with a packet received from a source host on an ingress port and assigned to a destination host communicatively coupled to a first egress port;
    determine based on the computed bandwidth consumption that the flow is congested;
    extract a flow identifier of the flow;
    calculate a quantitative flow throttle value for the flow; and
    build a packet configured to instruct the source host to throttle the flow; and
    send the packet to the source host via a second egress port.

10. The one or more tangible, non-transitory computer-readable mediums of claim 9, wherein the computed bandwidth consumption is based at least in part on a quality of service or service level agreement.

11. The one or more tangible, non-transitory computer-readable mediums of claim 9, wherein the packet comprises a congestion notification header (CNH) flag that is set, and a CNH comprising an L2 source, L2 destination, the flow identifier, and the quantitative flow throttle value.

12. The one or more tangible, non-transitory computer-readable mediums of claim 9, wherein the instructions are further to send the packet directly to the source host via the second egress port.

13. The one or more tangible, non-transitory computer-readable mediums of claim 9, wherein the quantitative flow throttle value is to achieve a throttling target in a single iteration.

14. The one or more tangible, non-transitory computer-readable mediums of claim 9, wherein the flow is associated with a traffic class, and wherein the quantitative flow throttle value is to conform the flow to a bandwidth allocation for the traffic class.

15. The one or more tangible, non-transitory computer-readable mediums of claim 9, wherein the instructions are to operate in a layer 3 (L3) transport-agnostic fashion.

16. The one or more tangible, non-transitory computer-readable mediums of claim 9, wherein computing the quantitative flow throttle value comprises computing a difference between Y comprising a source data rate for a service level of a traffic class, and X comprising a funded bandwidth share for the service level based on a quality of service policy.

17. The one or more tangible, non-transitory computer-readable mediums of claim 9, wherein the instructions comprise instructions to program an application-specific integrated circuit (ASIC).

18. The one or more tangible, non-transitory computer-readable mediums of claim 9, wherein the instructions comprise instructions to program a field-programmable gate array (FPGA).

19. The one or more tangible, non-transitory computer-readable mediums of claim 9, wherein the instructions comprise instructions to program an intellectual property (IP) block.

20. The one or more tangible, non-transitory computer-readable mediums of claim 9, wherein the instructions comprise software instructions for a processor.

21. A method of providing fast congestion response, comprising:
    computing a bandwidth consumption of a flow associated with a packet received from a source host on an ingress port and assigned to a destination host communicatively coupled to a first egress port;
    determining based on the computed bandwidth consumption that the flow is congested;
    extracting a flow identifier of the flow;
    calculating a quantitative flow throttle value for the flow; and
    building a packet configured to instruct the source host to throttle the flow; and
    sending the packet to the source host via a second egress port.

22. The method of claim 21, wherein the computed bandwidth consumption is based at least in part on a quality of service or service level agreement.

23. The method of claim 21, wherein the packet comprises a congestion notification header (CNH) flag that is set, and a CNH comprising an L2 source, L2 destination, the flow identifier, and the quantitative flow throttle value.

24. The method of claim 21, further comprising sending the packet directly to the source host via the second egress port.

25. A congestion notification generator (CNG) circuit to:
    compute bandwidth consumption of a flow associated with a packet received from a source host on an ingress port and assigned to a destination host communicatively coupled to a first egress port, and determine based on the computed bandwidth consumption that the flow is congested;
    extract a flow identifier of the flow;
    calculate a quantitative flow throttle value for the flow; and
    build a congestion notification packet configured to instruct the source host to throttle the flow.

* * * * *